United States Patent
Hors et al.

(10) Patent No.: US 12,522,338 B2
(45) Date of Patent: Jan. 13, 2026

(54) SYSTEM FOR CONTROLLING THE SPEED OF MOVEMENT OF A SLIDING DOOR AND ASSOCIATED AIRCRAFT

(71) Applicant: SAFRAN ELECTRONICS & DEFENSE, Paris (FR)

(72) Inventors: Daniel Hors, Moissy-Cramayel (FR); Célina Bur, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 18/726,986

(22) PCT Filed: Jan. 10, 2023

(86) PCT No.: PCT/FR2023/050035
§ 371 (c)(1),
(2) Date: Jul. 5, 2024

(87) PCT Pub. No.: WO2023/144481
PCT Pub. Date: Aug. 3, 2023

(65) Prior Publication Data
US 2025/0075549 A1    Mar. 6, 2025

(30) Foreign Application Priority Data
Jan. 28, 2022   (FR) ..................... 2200728

(51) Int. Cl.
*B64C 1/14* (2006.01)
*E05F 5/00* (2017.01)

(52) U.S. Cl.
CPC ............ *B64C 1/14* (2013.01); *B64C 1/1438* (2013.01); *E05F 5/003* (2013.01); *E05F 5/00* (2013.01);
(Continued)

(58) Field of Classification Search
CPC ... B64C 1/1438; B64C 1/14; E05Y 2900/502; E05Y 2201/21; E05Y 2201/26; E05F 5/003
See application file for complete search history.

(56) References Cited

U.S. PATENT DOCUMENTS 4,047,441 A * 9/1977 Kellogg ................ B64C 1/1407
74/52
4,838,333 A * 6/1989 Mottura ................... E06B 9/80
192/12 B
(Continued)

FOREIGN PATENT DOCUMENTS

| EP | 3326904 A1 | 5/2018 |
| EP | 3747760 A1 | 12/2020 |
| FR | 3072707 A1 | 4/2019 |

OTHER PUBLICATIONS

International Application No. PCT/FR2023/050035, International Search Report and Written Opinion, Mar. 31, 2023, 12 pages (2 pages of English translation and 10 pages of original document).

*Primary Examiner* — Justin B Rephann
(74) *Attorney, Agent, or Firm* — Kilpatrick Townsend & Stockton LLP

(57) ABSTRACT

The system for controlling the speed of opening a sliding door for an aircraft including a mechanical braking device for the door including a transmission shaft and a centrifugal absorber including a resistance shaft connected to the transmission shaft, and linking means that are designed to be connected to the sliding door and to cooperate with the transmission shaft so that when the sliding door moves in a predetermined direction, the linking means drive the transmission shaft and the centrifugal absorber applies a resistance torque to the transmission shaft in order to control the speed of movement of the door. The system includes a speed reducer connecting the resistance shaft to the transmission (Continued)

shaft so that the speed of rotation of the resistance shaft is greater than that of the transmission shaft when the sliding door moves in the predetermined direction.

9 Claims, 4 Drawing Sheets

(52) U.S. Cl.
CPC ..... *E05Y 2201/26* (2013.01); *E05Y 2900/502* (2013.01)

(56) References Cited

U.S. PATENT DOCUMENTS

| | | |
|---|---|---|
| 10,947,767 B2 * | 3/2021 | Barbieri ............... B65H 75/486 |
| 2013/0019432 A1 | 1/2013 | Smith |
| 2018/0028844 A1 * | 2/2018 | Wu .................... B65H 75/4439 |
| 2019/0119966 A1 * | 4/2019 | Barbieri .................... E05F 1/16 |
| 2025/0034930 A1 * | 1/2025 | Wittmaak, Jr. ....... B64C 1/1407 |

* cited by examiner

[Fig. 1]
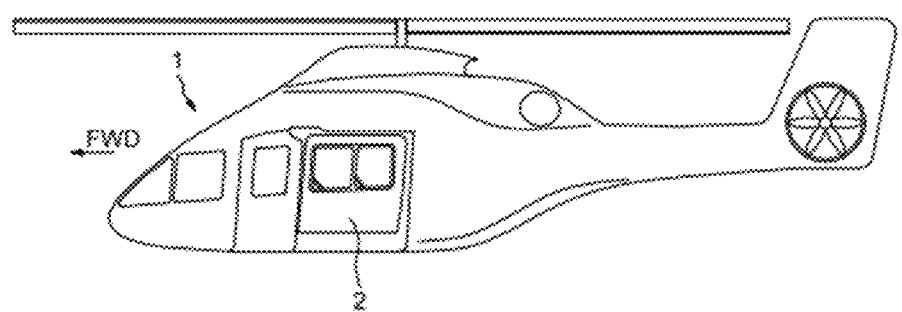
[Fig. 2]
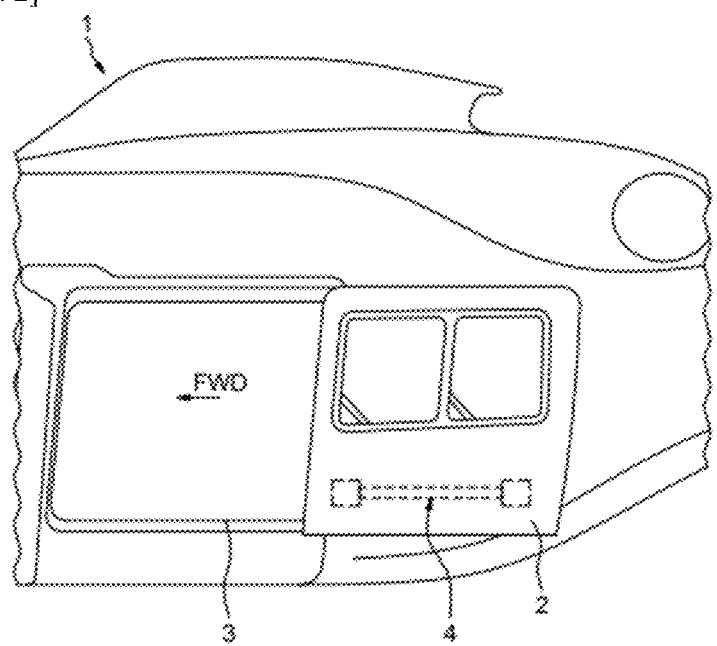

[Fig. 3]
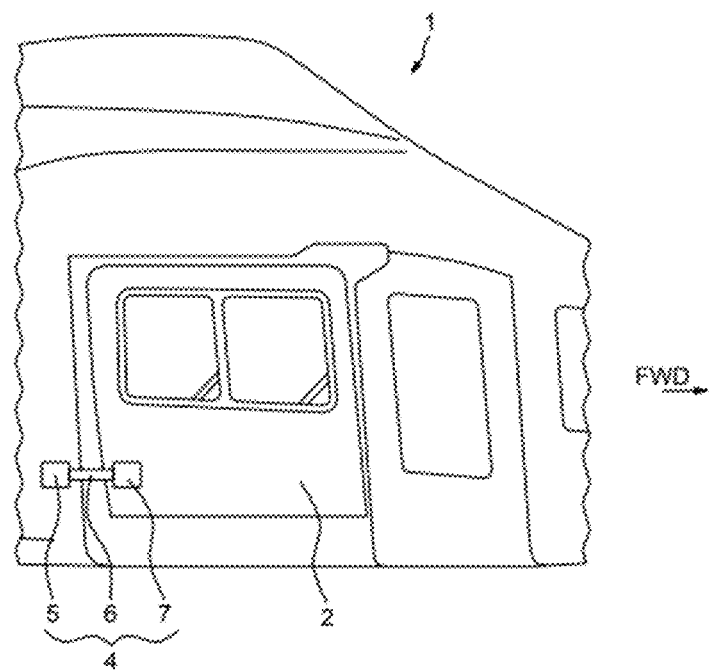

[Fig. 4]
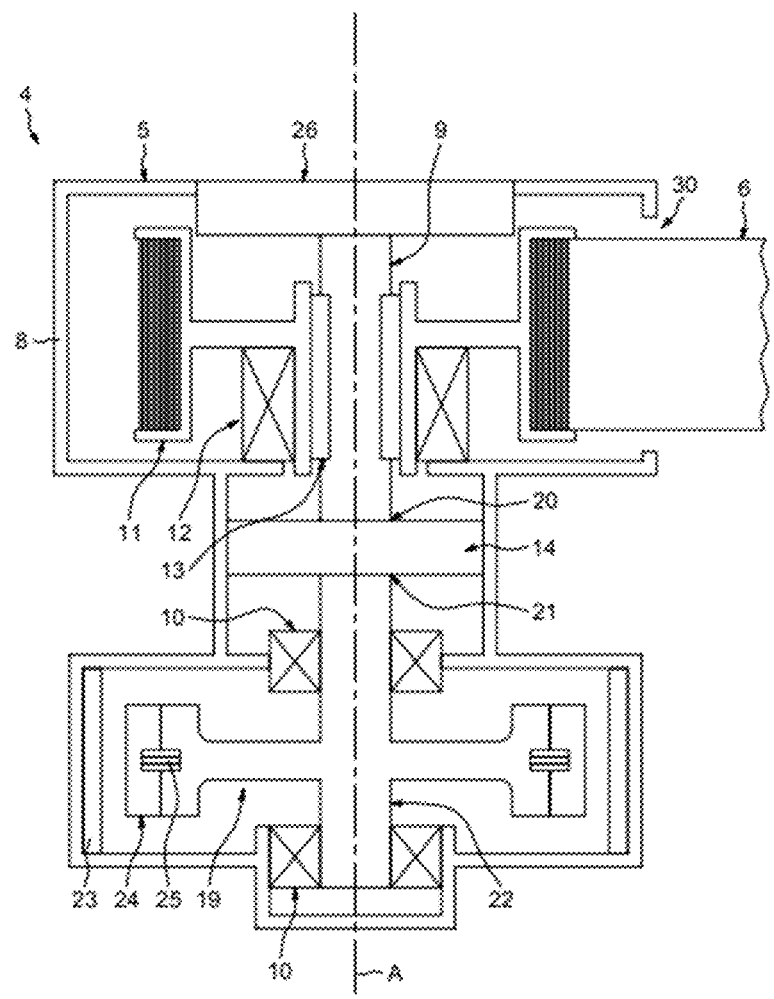
[Fig. 5]
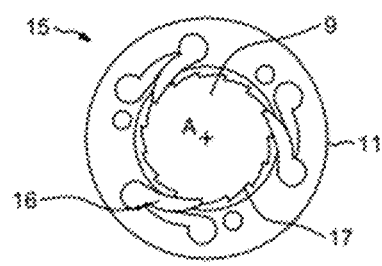

[Fig. 6]
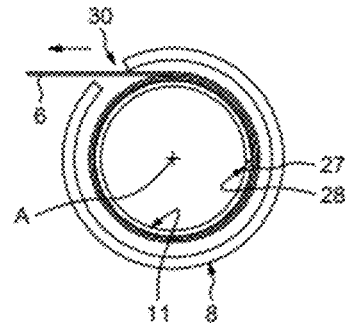
[Fig. 7]
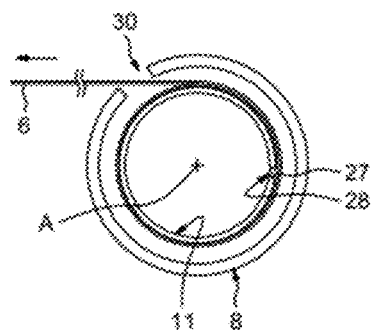
[Fig. 8]
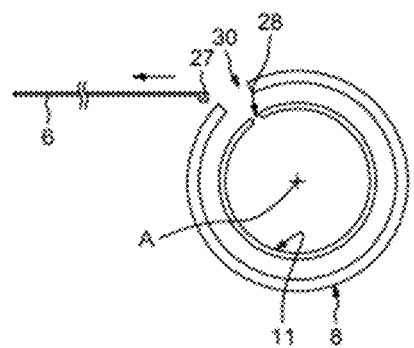

SYSTEM FOR CONTROLLING THE SPEED OF MOVEMENT OF A SLIDING DOOR AND ASSOCIATED AIRCRAFT

TECHNICAL FIELD OF THE INVENTION

The invention relates to systems for opening aircraft sliding doors, and more particularly systems for controlling the speed of movement of aircraft sliding doors and aircraft equipped with at least one such system.

PRIOR ART

Generally, an aircraft comprises a sliding side door provided to be opened during flight, for example, during a parachute drop or during a helicopter hoisting, when the aircraft is a helicopter.

During its opening, the sliding door is subjected to aerodynamic forces that may generate significant speeds of opening the door.

The aerodynamic forces applied on the sliding door are proportional to the square of the flight speed of the aircraft.

Generally, a helicopter is equipped with end of travel absorber cylinders for absorbing the shock generated by the sliding door reaching the stopper, thus protecting the structure of the helicopter.

However, such cylinders do not make it possible to control the speed of the sliding door during its travel, particularly at high flight speeds of the helicopter.

Documents FR3072707 and EP3747760 disclose a control device for slowing down the closing of a sliding door guided by a guide rail and having a winding shaft and a belt supported by the winding shaft and connected to the door.

The guide rail has a stopper.

The winding shaft further has a centrifugal brake connected to the belt by means of a shaft so that when the sliding door opens, the centrifugal brake slows the speed of opening of the sliding door by applying a resistance torque on the shaft.

The centrifugal brake has movable flyweights held radially on the drum by springs and rubbing against a metal surface disposed around the drum to generate the resistance torque.

The resistance torque is proportional to the square of the speed of rotation of the shaft and to the mass of the flyweights.

As the speed of rotation of the shaft is low, it is necessary to implement massive flyweights in the device increasing the mass and the size of said device, and reducing by as much the loading capacity of the aircraft.

Furthermore, if the stopper of the sliding door is damaged or nonexistent, the sliding door may escape from the guide rail and remain hooked up to the belt.

The swing of the sliding door may project the door against the aircraft during flight damaging the aircraft.

DISCLOSURE OF THE INVENTION

The aim of the invention is to overcome all or some of these drawbacks.

In light of the aforementioned, the object of the invention is a system for controlling the speed of opening a sliding door for an aircraft comprising a mechanical braking device for the door including a transmission shaft and a centrifugal absorber comprising a resistance shaft connected to the transmission shaft, and linking means that are designed to be connected to the sliding door and to cooperate with the transmission shaft so that when the sliding door moves in a predetermined direction, the linking means drive the transmission shaft and the centrifugal absorber applies a resistance torque to the transmission shaft in order to control the speed of movement of the door.

The system comprises a speed reducer connecting the resistance shaft to the transmission shaft so that the speed of rotation of the resistance shaft is greater than that of the transmission shaft when the sliding door moves in the predetermined direction.

The value of the resistance torque is proportional to the square of the speed of rotation of the resistance shaft and to the mass of the flyweights.

The speed reducer amplifies the speed of rotation of the resistance shaft so that for a given resistance torque value, the mass of the flyweights can be reduced making it possible to reduce the mass and the size of the device thus facilitating the integration of the system into the aircraft.

Advantageously, the centrifugal absorber comprises a cylinder coated with a friction material and flyweights disposed inside the cylinder and connected to the resistance shaft by connecting links so that the flyweights rub against the friction material under the effect of the centrifugal force when the speed of rotation of the resistance shaft is greater than or equal to a predetermined speed threshold.

Preferably, the braking device further comprises a clutching device connecting the resistance shaft to the belt so that the clutching device is clutched when the door moves in the predetermined direction and is declutched when the door moves in a direction other than the predetermined direction.

Advantageously, the aircraft has a guide rail of predetermined length guiding the sliding door, the linking means being configured to immobilize and retain the sliding door in the guide rail when the travel of said door in the predetermined direction is longer than the length of the rail.

Preferably, the aircraft has a guide rail of predetermined length guiding the sliding door, the linking means being configured to release the sliding door when the travel of said door in the predetermined direction is longer than the length of the rail.

Advantageously, the linking means comprise a belt, the braking device further comprises a winding mechanism configured to wind the belt around the transmission shaft when the door moves in a direction other than the predetermined direction.

Preferably, the system has a winding drum supporting the belt, the drum being connected to the transmission shaft.

Advantageously, the length of the belt tensioned between the door and the transmission shaft is shorter than the length of the rail.

Preferably, the belt and the drum comprise separation means for separating the belt from the sliding door or from the transmission shaft when the travel of said door in the predetermined direction is longer than the length of the rail.

An aircraft having a sliding door and a system such as defined above connected to the sliding door is also proposed.

BRIEF DESCRIPTION OF THE DRAWINGS

Other aims, features and advantages of the invention will appear upon reading the following description, given only by way of non-limiting example, and made with reference to the appended drawings wherein:

FIG. 1 schematically illustrates an aircraft having a sliding door according to the invention;

FIG. 2 schematically illustrates a partial view of the aircraft having a system for controlling the speed of opening of the sliding door according to the invention:

FIG. 3 schematically illustrates a partial view of the inside of the cockpit of the aircraft according to the invention:

FIG. 4 schematically illustrates an example of system for controlling the speed of opening of the sliding door according to the invention;

FIG. 5 schematically illustrates one example of embodiment of a clutching device according to the invention, and FIG. 6, FIG. 7 and FIG. 8 schematically illustrate one example of linking means according to the invention.

DETAILED DISCLOSURE OF AT LEAST ONE EMBODIMENT

Reference is made to FIG. 1 that schematically illustrates an aircraft 1 having a sliding door 2, shown in closed position, and provided to open during flight, a guide rail (not shown) guiding the sliding door 2, and a system 4 for controlling the speed of movement of the sliding door 2 (not shown).

The normal direction of movement of the aircraft is shown by an arrow FWD directed forwards. The door, for its part, opens rearwards and is therefore subjected to the aerodynamic forces generated during the movement of the aircraft 1.

It is assumed that the system 4 controls the speed of opening of the sliding door 2.

Alternatively, the system 4 controls the speed of closing of the sliding door 2.

The aircraft 1 as shown is a helicopter.

Of course, the aircraft 1 may be any type of aircraft having a sliding door provided to open during flight, for example an airplane having a sliding door.

FIG. 2 illustrates a partial view of the aircraft 1, from the outside, the sliding door 2 being open and engaged in the guide rail 3.

The sliding door 2 is bearing against a stopper (not shown) of the guide rail 3.

The system 4 for controlling the speed of movement of the sliding door 2 (shown in dotted lines) is placed in the cockpit of the aircraft 1.

FIG. 3 illustrates a partial view of the inside of the cockpit of the aircraft 1, the sliding door 2 being closed.

The control system 4 comprises a mechanical braking device 5 to limit the speed of movement of the sliding door 2 and mounted on the structure of the cockpit of the aircraft 1, and linking means having a belt 6 wound in the device 5 and attached to a fastening point 7 of the sliding door 2.

The braking device 5 here limits the speed of opening of the sliding door 2.

Alternatively, the braking device 5 may be mounted on the sliding door 2, and the belt 6 is fastened to a fastening point of the structure of the cockpit of the aircraft 1.

The linking means may further immobilize and retain the sliding door 2 in the guide rail 3 when the travel of the sliding door 2 is longer than the length of the guide rail in order to prevent the sliding door 2 from coming out of the guide rail 3 and deteriorating the aircraft 1.

The linking means make it possible to prevent the sliding door 2 from coming out of the guide rail 3 when the stopper of the guide rail 3 is damaged or nonexistent so as to prevent the sliding door 2 retained only by the linking means from damaging the aircraft 1.

Alternatively, the linking means release the sliding door 2 when the travel of the sliding door 2 is longer than the length of the guide rail.

As the trajectory of the sliding door 2 is dependent on the geometrical features of the sliding door 2, of the aircraft 1 and of the guide rail 3, the trajectory may be predetermined and optimized so as to eject the sliding door 2 from the aircraft 1 during flight without hitting against a sensitive part of the aircraft 1 making it possible to safely continue the flight.

The system 4 may be mounted indifferently on either side of the aircraft 1 in relation to a longitudinal axis of symmetry of the aircraft 1, according to the position of the door.

When the sliding door 2 opens, the belt 6 deploys by unwinding and extends under the effect of the translation of the sliding door 2.

According to another embodiment, the linking means comprise a rack fastened on the sliding door 2 and the device 5 comprises a pinion cooperating with the rack.

According to yet another embodiment, the linking means comprise a belt connected on the one hand to the device 5 and, on the other hand, to a pulley integral with the sliding door 2.

FIG. 4 illustrates one example of embodiment of the system 4.

It includes the braking device 5 and the belt 7.

The braking device 5 comprises a casing 8 comprising a transmission shaft 9 of central axis A rotationally held in the casing 7 by bearings 12 for example ball bearings and a passage 30 making it possible for the belt 6 to pass through the casing 8. Of course, the bearings 10 may be of another type, for example roller bearings or of the smooth bearings type.

The braking device 5 further comprises a winding drum 11 supporting the belt 6 and rotationally held in the casing 8 by the bearings 12.

The drum 11 is connected to a first end of the transmission shaft 9 by means of a clutching device 13.

The device 5 further comprises a speed reducer 14.

The clutching device 13 is clutched during the unwinding of the belt 6 so that the belt 6 drives the transmission shaft 9, and declutched during the winding of the belt 6 when the sliding door 2 closes facilitating the winding of the belt 6.

Alternatively, the device 5 does not comprise the clutching device 13, the transmission shaft 9 being driven by the belt 6 during its winding on the drum 11.

The clutching device 13 comprises for example a free wheel 15 as shown in FIG. 5.

The free wheel 15 comprises for example ratchets 16 cooperating with notches 17 so that during the unwinding of the belt 6, the ratchets 16 are engaged in the notches 17, and so that during the winding of the belt 6 around the transmission shaft 9 (closing of the sliding door 2), the ratchets 16 are no longer engaged in the notches 17.

The ratchets 16 are disposed on the drum 11, and the notches 17 are disposed on the transmission shaft 9.

Alternatively, the clutching device 13 comprises a roller free wheel.

The second end of the transmission shaft 9 is connected to a centrifugal absorber 19 by means of the speed reducer 14.

The speed reducer 14 comprises an input 20 connected to the transmission shaft 9 and an output 21 connected to the resistance shaft 22 of the centrifugal absorber 19.

The resistance shaft 22 is rotatably held in the casing 7 by bearings 10 for example ball bearings. Of course, the bearings 10 may be of another type, for example roller bearings or of the smooth bearings type.

When the sliding door 2 opens, the centrifugal absorber 19 applies a resistance torque Cr to the transmission shaft 9 by means of the resistance shaft 22 in order to control the speed of movement of the sliding door 2.

The centrifugal absorber 19 comprises a cylinder 23 coated with a friction material and flyweights 24 disposed inside the cylinder and connected to the resistance shaft 22 by connecting links 25.

The cylinder 23 is fastened on the casing 8.

When the speed of rotation of the resistance shaft 22 is greater than or equal to a predetermined speed threshold, under the effect of the centrifugal force, the movable flyweights 24 in relation to the resistance shaft 22 rub against the friction material generating the resistance torque Cr proportional to the square of the speed of rotation of the resistance shaft 22.

The speed threshold makes it possible to optimize the speed of opening of the sliding door 2 at low speed (lower than the speed threshold) by defining a zero resistance torque Cr.

The speed reducer 14 is sized so that the speed of rotation of the resistance shaft 22 is greater than that of the transmission shaft 9 when the sliding door 2 opens and comprises for example an epicycloidal speed reducer.

The speed reducer 14 makes it possible to amplify the speed of rotation of the resistance shaft 22 of the centrifugal absorber 19, the speed of rotation of the resistance shaft 22 being equal to the speed of rotation of the transmission shaft 9 multiplied by the ratio of the speed reducer 14.

As the value of the resistance torque Cr is proportional to the square of the speed of rotation of the resistance shaft 22 and to the mass of the flyweights 24, and the speed reducer 14 amplifies the speed of rotation of the resistance shaft 22, for a given resistance torque Cr value, the mass of the flyweights 24 can be reduced in relation to the flyweights of a braking device known from the prior art making it possible to reduce the mass and the size of the device 5 thus facilitating the integration of the system 4 into the aircraft 1.

The device 4 may further comprise a winding mechanism 26 (FIG. 4) to wind the belt 6 around the transmission shaft 9 when the sliding door 2 closes.

The winding mechanism 26 comprises for example a constant force coil spring cassette.

When the device 4 is equipped with the clutching device 13, the speed reducer 14 and the centrifugal absorber 19 are decoupled from the drum 11 facilitating the winding of the belt 6 around the drum 11.

The length of the belt 6 tensioned between the sliding door 2 and the transmission shaft 9 may be chosen as being shorter than the length of the guide rail 3 so that the belt 6 immobilizes and retains the sliding door 2 when the travel of the sliding door 2 is longer than the length of the guide rail 3 to prevent the sliding door 2 from coming out of the guide rail 3 and damaging the aircraft 1 under the effect of the swing projecting the sliding door 2 held by the single belt 6 against the aircraft 1.

Alternatively, the belt 6 is fastened so that it separates from the sliding door 2 or from the transmission shaft 9 when the travel of said door 2 is longer than the length of the guide rail 3.

The belt 6 releases the sliding door 2 when the travel of the sliding door 2 is longer than the length of the guide rail 3.

FIGS. 6, 7 and 8 illustrate one example of linking means releasing the sliding door 2 when the travel of the sliding door is longer than the length of the guide rail 3 not having a stopper, the belt 6 separating from the drum 11 and from the transmission shaft 9.

The belt 6 has an excrescence 27 and is wound with one or more protective turns around the drum 11 having an opening 28 so that the excrescence 27 inserted into the opening 26 holds the belt 6 secure with the drum 11.

When the sliding door 2 is in contact and held by the stopper of the guide rail 3, the belt 6 is held on the drum as shown in FIG. 6.

When the stopper of the guide rail 3 is nonexistent or unable to hold the sliding door 2, the belt 6 completely unwinds (FIG. 7) and is held on the drum by the excrescence 27 inserted into the opening 26.

When the opening 28 is opposite the passage 30 of the casing 8, the excrescence 27 escapes from the opening 28 so that the belt 6 escapes from the device 4.

The excrescence 27 cooperating with the opening 26 form separation means.

The invention claimed is:

1. A system for controlling a speed of opening a sliding door for an aircraft, the system comprising a mechanical braking device for the door, the mechanical braking device including a transmission shaft and a centrifugal absorber comprising a resistance shaft connected to the transmission shaft, and linking means that are designed to be connected to the sliding door and to cooperate with the transmission shaft so that when the sliding door moves in a predetermined direction, the linking means drive the transmission shaft and the centrifugal absorber applies a resistance torque to the transmission shaft in order to control the speed of movement of the door, wherein the system comprises a speed reducer connecting the resistance shaft to the transmission shaft so that a speed of rotation of the resistance shaft is greater than that of the transmission shaft when the sliding door moves in the predetermined direction,
wherein the braking device further comprises a clutching device connecting the resistance shaft to a belt so that the clutching device is clutched when the door moves in the predetermined direction and is declutched when the door moves in a direction other than the predetermined direction.

2. The system according to claim 1, wherein the centrifugal absorber comprises a cylinder coated with a friction material and flyweights disposed inside the cylinder and connected to the resistance shaft by connecting links so that the flyweights rub against the friction material under the effect of the centrifugal force when the speed of rotation of the resistance shaft is greater than or equal to a predetermined speed threshold.

3. The system according to claim 1, the aircraft having a guide rail of predetermined length guiding the sliding door, the linking means being configured to immobilize and retain the sliding door in the guide rail when the travel of said door in the predetermined direction is longer than the length of the guide rail.

4. The system according to claim 1, the aircraft having a guide rail of predetermined length guiding the sliding door, the linking means being configured to release the sliding door when the travel of said door in the predetermined direction is longer than the length of the guide rail.

5. The system according to claim 1, wherein the linking means comprise the belt, the braking device further comprising a winding mechanism configured to wind the belt around the transmission shaft when the door moves in a direction other than the predetermined direction.

6. The system according to claim 5, having a winding drum supporting the belt, the drum being connected to the transmission shaft.

7. The system according to claim 5, wherein a length of the belt tensioned between the door and the transmission shaft is shorter than a length of a guide rail.

8. The system according to claim 5, wherein the belt and a winding drum comprise separation means for separating the belt from the sliding door or from the transmission shaft when the travel of said door in the predetermined direction is longer than a length of a guide rail.

9. An aircraft comprising a sliding door and the system according to claim 1 connected to the sliding door.

* * * * *